United States Patent
Macaluso (10) Patent No.: US 6,295,755 B1
(45) Date of Patent: Oct. 2, 2001

(54) ADJUSTABLE ARM SUPPORT FOR FISHING ROD HANDLE

(76) Inventor: Michael Macaluso, 9 Kassel Ct.., Mamaroneck, NY (US) 10543

( * ) Notice: Subject to any disclaimer, the term of this patent is extended or adjusted under 35 U.S.C. 154(b) by 0 days.

(21) Appl. No.: 09/427,408

(22) Filed: Oct. 25, 1999

(51) Int. Cl.[7] .......................... A01K 87/00; A01K 97/10
(52) U.S. Cl. .................................................. 43/25; 43/21.2
(58) Field of Search ................................ 43/21.2, 23, 25; 248/230.6, 231.71

(56) References Cited

U.S. PATENT DOCUMENTS

| | | | |
|---|---|---|---|
| 1,266,367 | * | 5/1918 | Wilson .................................. 43/21.2 |
| 2,146,350 | * | 2/1939 | Roberts .................................. 43/25 |
| 2,158,104 | * | 5/1939 | Bowen .................................. 43/25 |
| 2,244,408 | * | 6/1941 | Thompson .............................. 43/25 |
| 3,367,056 | * | 2/1968 | Johnson .................................. 43/25 |
| 3,372,510 | * | 3/1968 | Arsenault ................................ 43/25 |
| 4,190,977 | * | 3/1980 | Casper .................................. 43/21.2 |
| 5,007,612 | * | 4/1991 | Manfre .............................. 248/231.7 |

* cited by examiner

Primary Examiner—Kurt Rowan
(74) Attorney, Agent, or Firm—Lackenbach Siegel Marzullo Aronson & Greenspan, P.C.

(57) ABSTRACT

A device supporting the arm of a fisherman using a spinning-type fishing rod having a cylindrical rod handle, comprising an adjustable rotatable arm cradle supporting the upper forearm of the fisherman, a partially cylindrical elongated handle support member defining a partially cylindrical compartment that holds a selected area of the fishing rod handle in alignment with the arm cradle, an adjustable post connecting the arm cradle means with the handle, and an adjustable clamp for removably gripping the rod handle to the handle support. The arm cradle is rotatable to a selected angle relative to the rod handle and is removably lockable at the selected angle. The connecting post can be lengthened or shortened to a selected position and removably locked at that position. The clamp that presses the fishing rod handle against the top of the holding compartment of the handle support member is adjustable by means of a vertical screw that raises or lowers the clamp.

12 Claims, 9 Drawing Sheets

ADJUSTABLE ARM SUPPORT FOR FISHING ROD HANDLE

FIELD OF THE INVENTION

The present invention relates generally to fishing rods and in particular to spinning-type fishing rods.

DESCRIPTION OF THE PRIOR ART

A spinning-type fishing rod has a long, flexible rod that creates unusual stresses on the arm of the fisherman when a fish has struck the bait and the fisherman must both fight the strength of the struggling fish and eventually struggle to reel in the fish. The arm of the fisherman is aligned at an unnatural angle during the time of maximum leverage when the rod is being pulled upwardly during a strike and likewise during the time the fisherman is reeling in the fish. Stresses are typically concentrated on the forearm of the fisherman and in particular in the wrist area of the forearm. It is apparent that as the forearm of the fisherman becomes aligned with the handle of the rod, the wrist area becomes bent at an angle relative to the rest of the forearm as pressure grows during strike activity and the fishing rod is being pulled upwardly so that unusual stress is concentrated at the sharply bent wrist, which restricts blood circulation at the wrist.

Prior art that has attempted to overcome the problem of forearm and wrist stress while fishing with a spinning rod includes patents that have the object of supporting the forearm of a fisherman holding a long fishing rod. U.S. Pat. No. 4,014,129 issued to Capra on Mar. 29, 1977, provides a fishing rod stabilizing handle which directly replaces the conventional posterior rod handle of the spinning rod or which is configured as an attachment for engagement to the conventional posterior handle. The rod stabilizing handle of is a broad upwardly directed elongate surface projecting from one side of the handle for alignment with and direct engagement of a substantial length of the underside of the forearm portion of the fisherman. U.S. Pat. No. 5,390,438, issued to Warren, Jr. on Feb. 23, 1995, describes an arm support for stabilizing a fishing rod on the arm of a fisherman and for removing at least some of the playing pressure of a fish or heavy lures from the fisherman's wrist while the fisherman is playing the fish on a fishing line extending from a reel mounted on the fishing rod, which arm support includes an elongated straight portion which protrudes rearwardly from fixed or removable attachment to the handle of the fish rod and a generally C-shaped curved portion including multiple, short, straight rod segments connected together and shaped to fit beneath the forearm of the fisherman. One end of the curved portion is positioned under the fisherman's wrist and the other end is located under the forearm so that the curved portion exerts pressure upwardly against the fisherman's wrist and forearm. U.S. Pat. No. 5,313,735 issued to Latouch on May 24, 1994 discloses a weight bearing extension that includes a long flange portion and a coupling portion connected to a fishing rod handle. Splines run on the outside of a shaft that cooperates with splines on the inside surface of a cylindrical hole in the extension make possible the rotation of the extension. Rotation can be prevented. U.S. Pat. No. 3,372,510 issued to Arsenault on Mar. 12, 1968, discloses a hand grip and an arm support disposed in the axial direction of a fishing rod and connected to the rod handle.

SUMMARY OF THE INVENTION

It is therefore an object of the present invention to provide a device for supporting the arm of a fisherman using a spinning-type fishing rod that is adjustable to accommodate and support the forearms of fishermen of various sizes.

It is a further object of the present invention to provide a device for supporting the forearm of various sizes of fisherman that is adjustable in two dimensions and that is further capable of clamping various sizes of fishing rod handles to the device.

In accordance with this object and other objects that will become apparent in the course of this disclosure, there is provided a device supporting the arm of a fisherman using a spinning-type fishing rod having a cylindrical rod handle comprising an adjustable rotatable arm cradle supporting the upper forearm of the fisherman, a partially cylindrical elongated handle support member defining a partially cylindrical compartment that holds a selected area of the fishing rod handle in alignment with the arm cradle, an adjustable post connecting the arm cradle means with the handle, and an adjustable clamp for removably gripping the rod handle to the handle support. The arm cradle is rotatable to a selected angle relative to the rod handle and is removably lockable at the selected angle. The connecting post can be lengthened or shortened to a selected position and removably locked at that position. The clamp that presses the fishing rod handle against the top of the holding compartment of the handle support member is adjustable by means of a vertical screw that raises or lowers the clamp.

The present invention will be better understood and the objects and important features, other than those specifically set forth above, will become apparent when consideration is given to the following details and description, which when taken in conjunction with the annexed drawings, describes, illustrates, and shows preferred embodiments or modifications of the present invention and what is presently considered and believed to be the best mode of practice in the principles thereof.

Other embodiments or modifications may be suggested to those having the benefit of the teachings therein, and such other embodiments or modifications are intended to be reserved especially as they fall within the scope and spirit of the subjoined claims.

DETAILED DESCRIPTION OF THE INVENTION

Reference is now made to the drawings and in particular to FIGS. 1–7 in which identical or similar parts are designated by the same reference numerals throughout.

Figure 1:
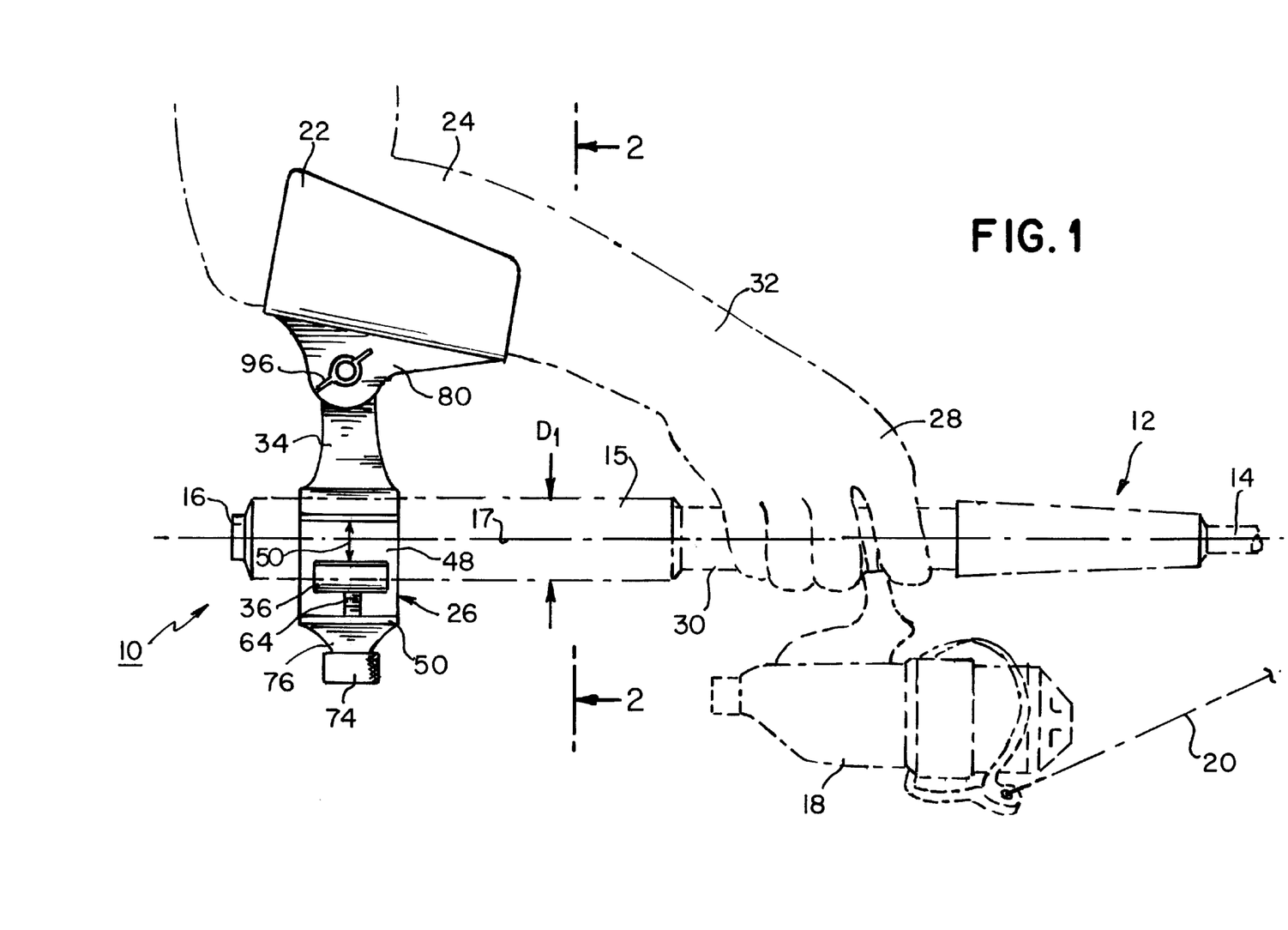
FIG. 1 is a side elevational view of an adjustable arm support device for a fisherman in accordance with the present invention holding a spinning-type rod with the a portion of the fishing rod, the fishing rod handle and the spinner being attached to the rod handle, which is shown in phantom line, and further showing the forearm, wrist, and hand of a fisherman holding the rod handle, which are also shown in phantom line.

FIG. 1 shows an adjustable arm support device 10 supporting the arm of a fisherman using a spinning-type fishing rod 12 including a long rod 14, partially shown, and a cylindrical rod handle 15 with a butt end 16 having an cylindrical axis 17 and a line reel 18 positioned below rod handle 15 holding a fishing line 20 that is clamped to rod handle 15 in a manner known in the art. Cylindrical axis 17 of rod handle 15 is shown as horizontal for purposes of exposition but can be aligned at a plurality of angles relative to the horizontal.

Figure 2:
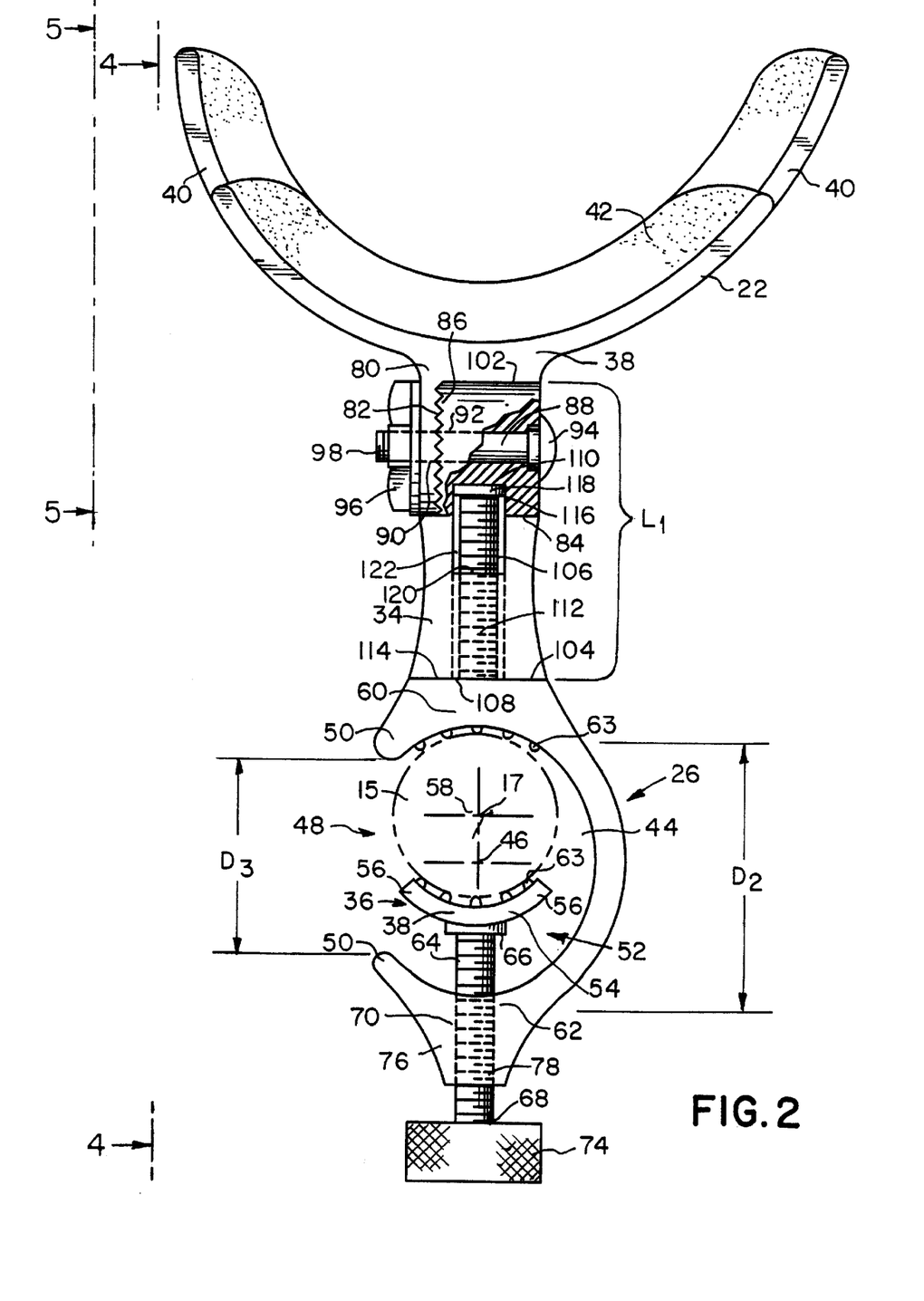
FIG. 2 is a front view of the adjustable arm support taken through line 2—2 of FIG. 1 with the connecting post being shown in a shortened mode with the fishing rod being shown in phantom line mounted to the adjustable arm support.
Figure 3:
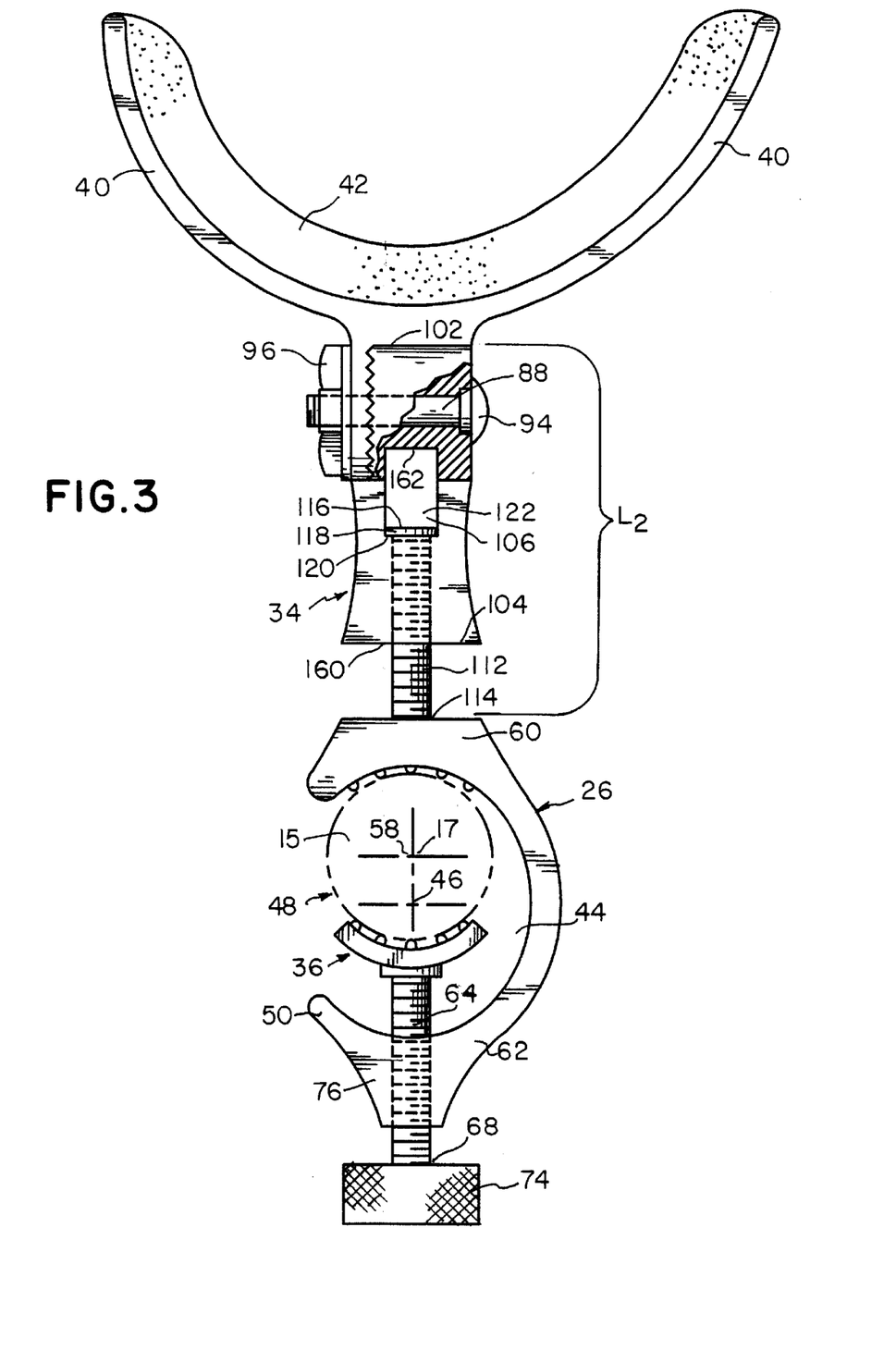
FIG. 3 is a front view of the adjustable arm support similar to the view shown in FIG. 2 with the adjustable connecting post being shown in an extended mode.
Figure 4:
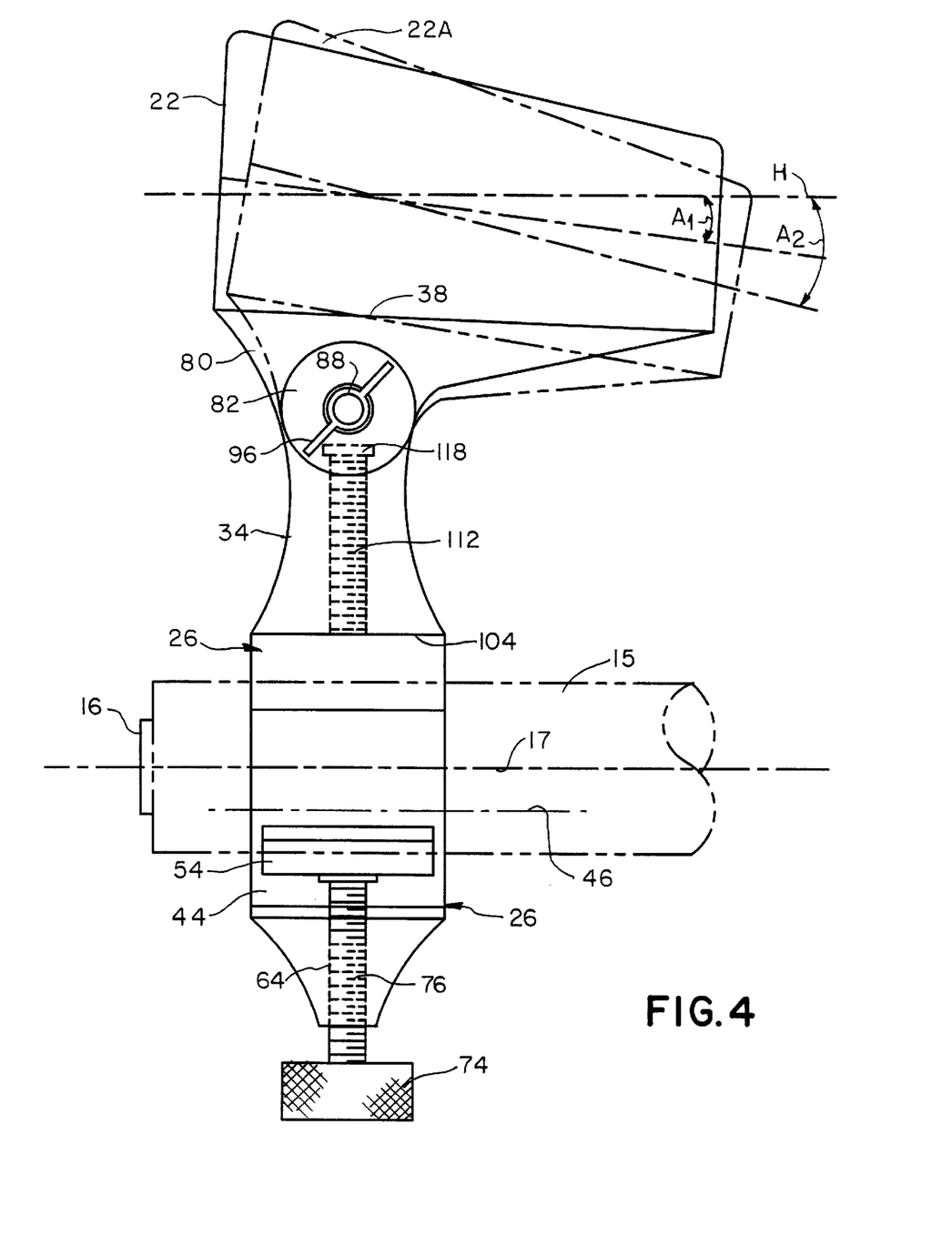
FIG. 4 is a side view taken through line 4—4 of FIG. 2 with the cradle member at a first rotated angle relative to the rod handle and the cradle member further being shown in phantom line at a second rotated angle relative to the rod handle.

Arm support device 10, which is also shown in FIGS. 2, 3, and 4, also includes an elongated arm cradle 22 for supporting the upper forearm 24 of the fisherman. A fishing rod handle support member 26 holds a selected area of rod handle 15 in alignment with and positioned below arm cradle 22. Hand 28 of the fisherman holds a gripping portion 30 of rod handle 15 with wrist 32 of the fisherman being substantially aligned with forearm 24, that is, wrist 32 is minimally angled relative to forearm 24.

Arm support device 10 further includes a post member 34 that connects arm cradle 22 with handle support member 26 and a clamping device 36 for removably gripping or securing rod handle 15 to handle support member 26.

Figure 5:
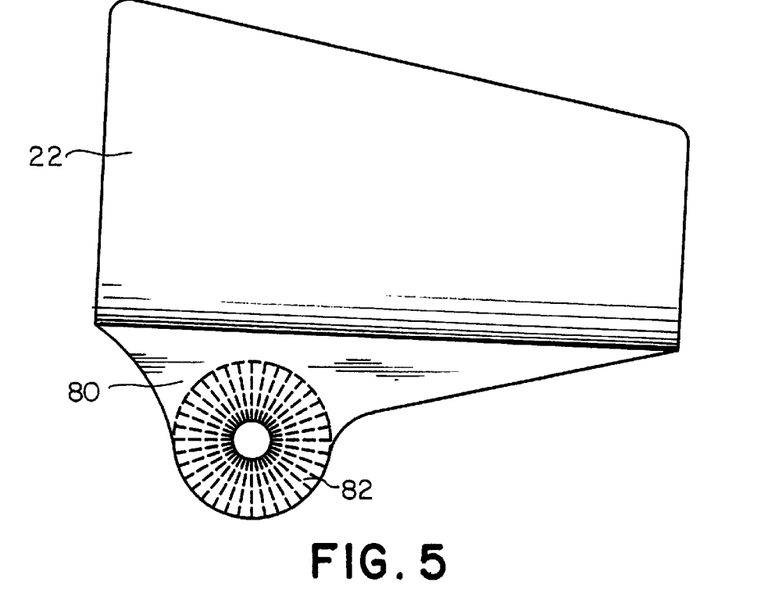
FIG. 5 is a side view taken through line 5—5 in FIG. 2 of the cradle member taken in isolation.
Figure 6:
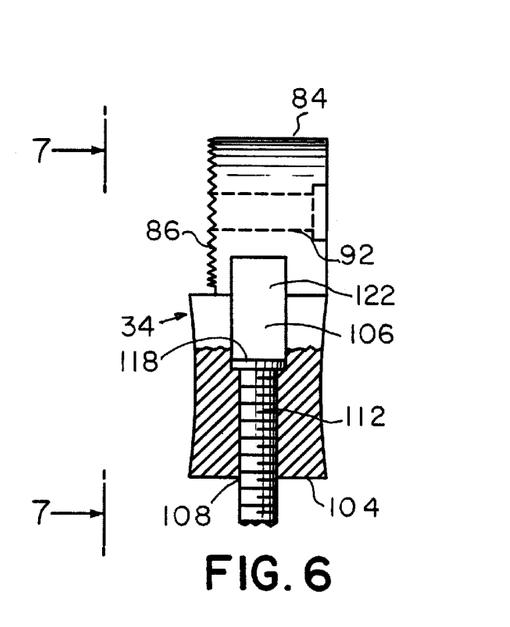
FIG. 6 is a front view of the post member shown in FIG. 2 taken in isolation.
Figure 7:
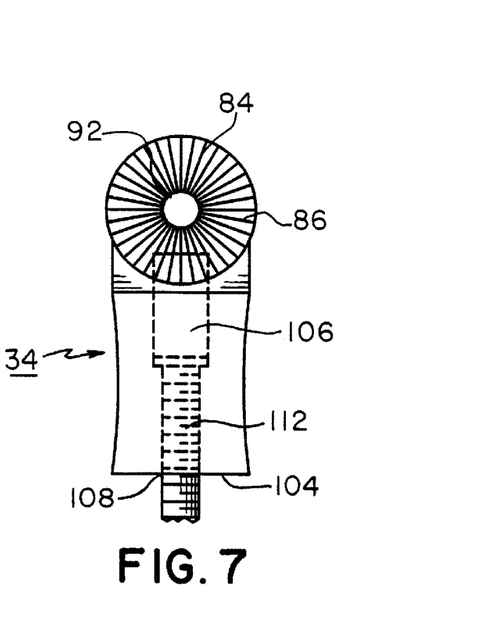
FIG. 7 is a side view of the post member taken through line 7—7 in FIG. 6.

Arm cradle 22, also shown in isolation in FIG. 5, is arced and has a slightly arced cradle bottom portion 38 and a pair of slightly curved cradle side arms 40 that extend upwardly from cradle bottom portion 38. Cradle cushion material is attached to the top side of cradle 22. Cradle bottom portion 38 and curved cradle side arms 40 are configured to provide support to upper forearm 24. Arm cradle 22 is adjustable and can be rotated to various cradle angles relative to rod handle 15, which is gripped in handle support member 26. FIG. 4 shows arm cradle 22 at a selected first rotated position 22A at a downward cradle angle $A_1$ relative to the horizontal that can be compared to the cradle angle shown in FIGS. 1 and 2. For purposes of exposition, FIG. 4 shows arm cradle 22 at a selected second rotated position indicated in phantom line as arm cradle 22A at a downward cradle angle $A_2$ relative to rod handle axis 17 with angle $A_2$ being greater than angle $A_1$. Arm cradle 22 can be rotated to and be releasably locked at a plurality of selected angles and likewise can be unlocked from any selected angle.

Post member 34 is adjustably movable between arm cradle 22 and handle support member 26 to a selected length, at which position post member 34 can be locked at the selected length. For purposes of exposition, the adjustability of post member 34 is shown in FIGS. 2 and 3 with post member 34 at a first selected position in FIG. 2 wherein post member 34 has a first selected length $L_1$, and with post member 34 at a second selected position in FIG. 3 wherein post member 34 has a second selected length $L_2$, wherein second selected length $L_2$ is greater then first selected length $L_1$.

Handle support member 26 defines a generally cylindrical holding compartment 44 having a compartment axis 46 aligned with axis 17 of rod handle 15. Rod handle 15 is substantially cylindrical throughout its length and has a rod handle diameter $D_1$ as shown in FIG. 1. Cylindrical holding compartment 44 has a compartment diameter $D_2$ (see FIG. 2) greater than rod handle diameter $D_1$. Rod handle 15 is supported by handle support member 26 positioned in holding compartment 44. Handle support member 26 further defines an elongated side aperture 48 that opens to holding compartment 44. Aperture 48 is further defined by opposed elongated linear side edges 50 aligned with compartment axis 46, with a distance $D_3$ as indicated in FIG. 2 between opposed linear side edges 50 greater than rod handle diameter $D_1$. Thus, rod handle 15 can be positioned in holding compartment 44 either by backing rod handle 15 into holding compartment 44 at butt end 16 first or by sliding rod handle 15 into holding compartment 44 sideways through side aperture 48.

As shown in FIGS. 2, 3, and 4, clamping device 36 includes an elongated arc-shaped handle brace 54 having a pair of upwardly extending arms 56 that are positioned in holding compartment 44 and having an elongated arc axis 58 in vertical planar alignment with compartment axis 46. Handle support member 26 includes a support member arced top portion 60 aligned over compartment axis 46 and an opposed arced support arced bottom portion 62 aligned under compartment axis 46. Arc-shaped handle brace 54 is positioned in opposition to and under support member arced top portion 60. Cylindrical rod handle 15 is positioned between support member arced top portion 60 and arc-shaped handle brace 54 in contact with a plurality of grips 63 that are connected to arced top portion 60 and to arced bottom portion 62.

Clamping device 36 further includes a screw member 64 that includes a screw member top end 66 secured to bottom portion 57 of arc-shaped handle brace 54 and a screw member bottom end 68 external to handle support member 26. Handle support member arced bottom portion 62 defines a threaded hole 70. Screw member 64 threadably extends through threaded hole 70. A hand grip 74 for rotating screw member 64 is connected to screw member bottom end 68 external to handle support member 26. Hand grip 74 is shown as a knurled head, or thumb wheel, in FIGS. 1, 2 and 3. Hand grip 74 can also have other configurations such as a butterfly-type hand grip. As shown in FIGS. 2 and 3, handle support member 26 optionally includes a neck portion 76 that extends downward from handle support member arced bottom portion 62. A neck portion threaded hole 78 aligned with threaded hole 70 extends downward through neck portion 76 with hand grip 74 being positioned external to neck portion 76.

Arm cradle 22 shown in isolation in FIG. 5 includes a cradle flange 80 also seen in FIGS. 2 and 3 that extends downwardly from cradle bottom portion 38 in a plane lateral to and spaced from compartment axis 46. Cradle flange 80 has a plurality of first radial teeth 82 that extend inward relative to compartment axis 46. Post member 34, which is shown in isolation in FIGS. 6 and 7, includes a post flange 84 also seen in FIGS. 2 and 3, having a plurality of second radial teeth 86 that extend in a circular configuration directly facing first radial teeth 82. An axial bolt 88 threaded at one end, extends transversely through a transverse bolt hole 90 in cradle flange 80 and through an aligned transverse bolt hole 92 in post flange, and such bolt 88 passes through the aligned centers of the first and second radial teeth 82 and 86. A flat bolt head 94 connected to one end of axial bolt 88 is pressed against the outer surface of post flange 84, and a wing nut 96 is in threaded relationship with the threaded opposite end 98 of axial bolt 88. FIGS. 2, 3, and 4 show wing nut 96 having been rotated inwardly relative to cradle flange 22 so as to press cradle flange 80 and post flange 84 tightly together and so press first and second radial teeth 82 and 86 together in locked relationship so that cradle arm 22 is in a locked mode as shown in FIGS. 1, 2, 3, and in particular in FIG. 4 at angle $A_1$ relative to the horizontal and in particular relative to holding compartment 44 and to fishing rod handle 15, the latter being shown as being aligned at the horizontal H for purposes of exposition.

Figure 17:
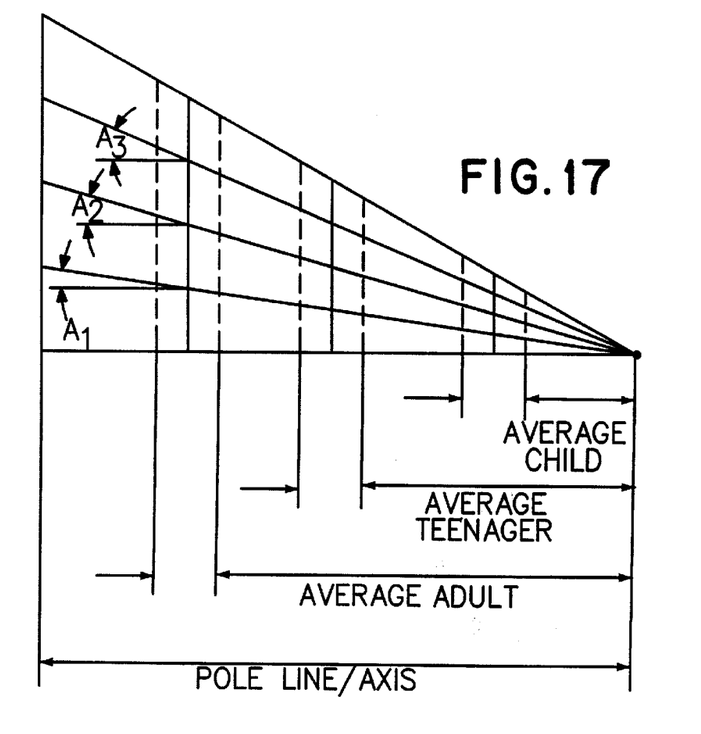
FIG. 17 is a chart indicating adjustments of the post member and arm cradle as schematically related to the lengths of the forearms of various sizes of different age groups.

Cradle arm 22 is released from the locked mode by removing axial bolt 88 from engagement with cradle flange 80 and post flange 84. Wing nut 96 is unthreaded from threaded end 98 of axial bolt 88, which is then slid from bolt hole 90 and bolt hole 92 and cradle flange 80 and post flange 84 are moved transversely relative one to the other so as to be disengaged, and first and second radial teeth 82 and 86 are likewise disengaged and spaced from one another in an unlocked mode. With particular reference to FIG. 4, arm cradle 22 can at the time of disengagement can be rotated upwardly or downwardly to adjust cradle arm 22 to accommodate the particular length of forearm 22 as seen in FIG. 1. As previously mentioned, arm cradle 22A is shown in FIG. 4 in phantom line having been rotated downward from a position at angle $A_1$ relative to the horizontal H over a desired angle to an angle $A_2$. At the new $A_2$, the forearm 24 in arm cradle 22 is tilted further downwardly relative to rod handle 15 as compared to angle $A_1$. The result of this new angled position is that the tilt of a shorter forearm of a fisherman is accommodated by maintaining the relative alignment of wrist 32 with forearm 24. FIG. 17 indicates in schematic graphic form an angle $A_1$ is generally suitable for an average adult, that increased angle $A_2$ is generally suitable for an average teenager, and that an increased angle $A_2$ is generally suitable for a child.

When new angle $A_2$ is achieved, post member 34 and arm cradle 22 are moved transversely and pressed together so that first and second radial teeth 82 and 86 are intermeshed and bolt 90 is inserted into bolt holes 70 and 72 and wing nut 96 is placed threaded end 98 and rotated so as to lock cradle flange 80 and post flange 84, wherein they are engaged in a new locked mode at new selected angle $A_2$, wherein in the new locked mode arm cradle 22 is non-rotatable about axial bolt 88 relative to handle support member 26. Thus, adjustment of the cradle angle is relatively simple and is achieved by loosening the wing nut on the bolt so that the meshing radial teeth can be re-positioned at a different angular relationship.

Post member 34 includes a post top end 102 positioned adjacent to arm cradle bottom portion 38 and a free bottom end 104. Post member 34 defines a central post threaded screw hole 106 aligned transverse to axial bolt 88 in planar alignment with arc axis 58 of handle brace 54 and with holding compartment axis 46. Post screw hole 106 has an open bottom end 108 and a post screw hole upper end 110. A post screw 112 is mounted in screw hole 106 has a post screw lower end 114 connected to handle support member arced top portion 60 and a post screw free upper end 116. As shown in FIGS. 2 and 3 handle support member 26 is rotatable relative to arm cradle 22 about post screw 112 in one of a post lengthening direction and a post shortening direction, wherein in the post lengthening direction post member 34 is drawn away from handle support member 26, and wherein in the post shortening direction post member 34 is drawn towards handle support member 26. As previously described, post member 34 including post screw 112 is shown in FIG. 2 at its short length $L_1$ with screw free upper end 116 being positioned at post screw hole top end 110. Post member 34 including post screw 112 is shown in FIG. 3 at a length $L_2$ that is greater than length $L_1$ with post screw free upper end 116 being spaced from the screw hole upper end 110. The difference between length $L_2$ and length $L_1$ is the distance between screw upper free end 116 and post screw hole top end 110. Post screw free upper end 110 has a limit cap 118 that prevents post member 34 from passing beyond a post limit stop 120 positioned in post screw hole 106. Post member 34 optionally has a window 122 that permits the placement of limit cap 118 onto post screw free upper end 110 during manufacturing. Limit cap 118 can also be a snap-on wing-type cap that is secured to post screw free upper end 116 in the manufacturing process, and as post screw 112 is threaded into post threaded screw hole 106, the snap-on cap is biased by the surface of post threaded screw hole 106 into its biased mode until is passes limit stop 120 at which time the cap self-biases into an open unbiased mode that extends itself beyond the inner structure of limit stop 120.

Figure 8:
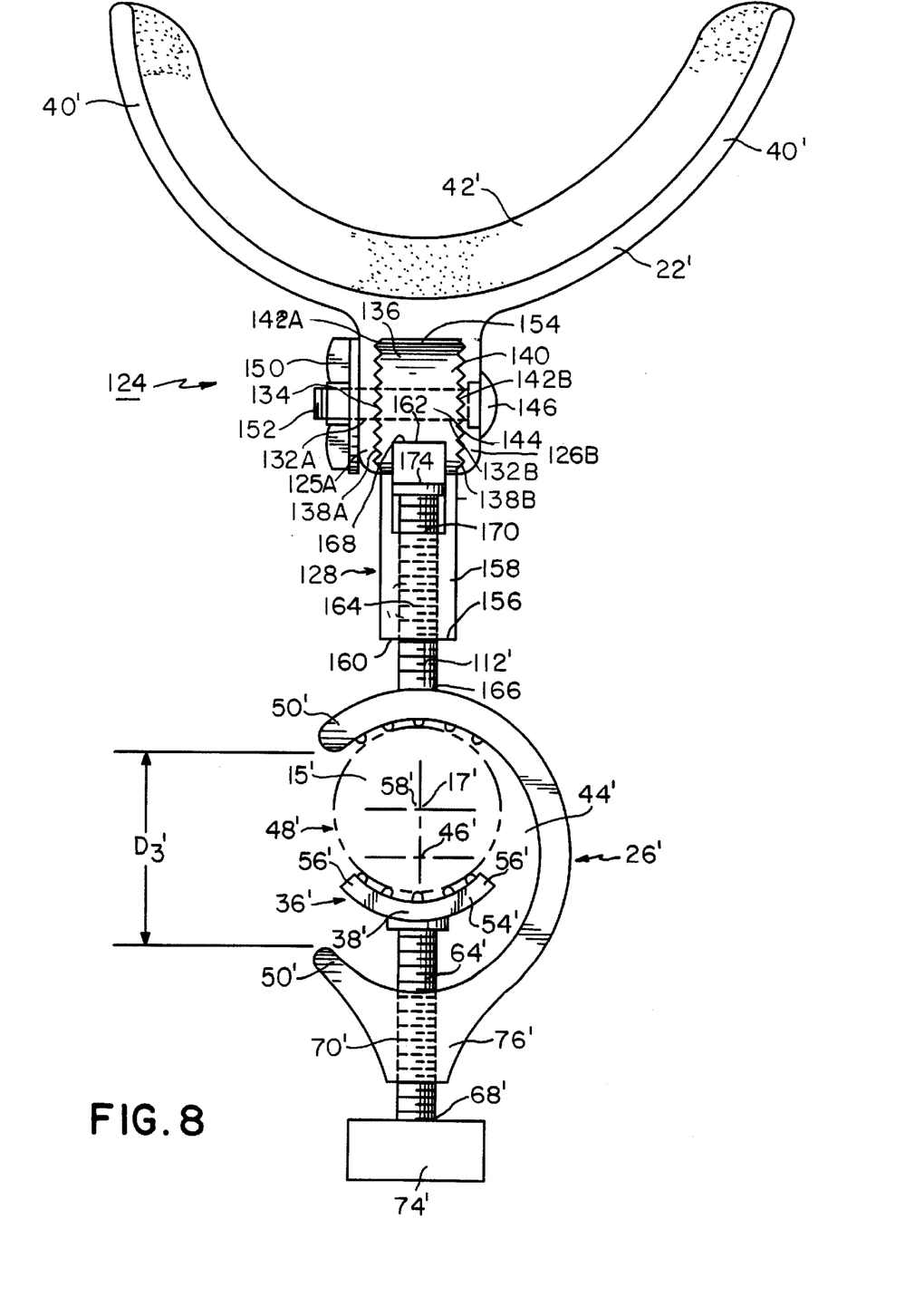
FIG. 8 is a front view of a second embodiment of the present invention analogous to the view of the first embodiment shown in FIG. 1.

FIG. 8 shows an adjustable arm support device 124 that is another embodiment of adjustable arm support device 10 wherein those elements that are the same or similar as adjustable arm support device 10 have the same reference numerals accompanied by accents, or primes (').

Adjustable arm support device 124 is analogous to adjustable arm support 10 specifically as shown in FIG. 2. FIG. 8 shows a cylindrical rod handle 15' and an elongated arm cradle 22' for supporting the forearm of a fisherman in the same manner as adjustable arm support device 10. A fishing rod handle support member 26' holds a selected area of rod handle 15' in alignment with and positioned below arm cradle 22'.

Arm cradle 22' includes cradle double flanges 126A and 126B spaced apart that extend downwardly from cradle bottom portion 38' (as seen in FIG. 2) in planes lateral to and spaced at equal distances from compartment axis 46' of holding compartment 44' positioned below arm cradle 22'. A adjustable post member 136 connects arm cradle 22' and holding compartment 44'. Arm cradle 22' is arced and has a slightly arced cradle bottom portion 38' and a pair of slightly curved cradle side arms 40' that extend upwardly from cradle bottom portion 38'. Cradle bottom portion 38' and a pair of slightly curved cradle side arms 40' are configured to provide support to the upper forearm of the fisherman. Arm cradle 22' is adjustable and can be rotated to various cradle angles relative to rod handle 15', which is gripped in handle support member 26'. Arm cradle 22' can be rotated to and be releasably locked at a plurality of selected angles and likewise can be unlocked from any selected angle.

Post member 136 is adjustably movable between arm cradle 22' and a handle support member 26' to a selected length, at which position post member 136 can be locked at the selected length. For purposes of exposition, the adjustability of post member 136 is analogous to that shown of post member 34 shown in FIGS. 2 and 3 art two selected lengths $L_1$ and $L_2$ where post member 34 is shown at a first selected position in FIG. 2 wherein post member 34 has a first selected length $L_1$, and with post member 34 at a second selected position in FIG. 3 wherein post member 34 is at a second selected length $L_2$. Post member 136 as shown in FIG. 8 is analogous to the position of post member 34 shown in FIG. 3 positioned at second selected length $L_2$.

Handle support member 26' defines a generally cylindrical holding compartment 44' having a compartment axis 46' aligned with the cylindrical axis 48' of rod handle 15'. Rod handle 15' is substantially cylindrical throughout its length and has a rod handle diameter $D_1'$ as shown in FIG. 1. Cylindrical holding compartment 44' has a compartment diameter $D_2'$ (see FIG. 2) greater man rod handle diameter Rod handle 15' is supported by handle support member 16' positioned in holding compartment 44' as shown in FIG. 8. Handle support member 26' further defines an elongated side aperture 48' that opens to holding compartment 44'. Aperture 48' is further defined by opposed elongated linear side edges 50' aligned with compartment axis 46', with a distance $D_3'$ as indicated in FIG. 8 between opposed side edges 50' greater than rod handle diameter $D_1'$. Thus, rod handle 15' can be positioned in holding compartment 44' either by backing rod handle 15' into holding compartment 44' at butt end 16 first or by sliding rod handle 15' into holding compartment 44' sideways through side aperture 48'.

As shown in FIG. 8 clamping device 52' includes an elongated arc-shaped handle brace 54' having a pair of upwardly extending arms 56' that are positioned in holding compartment 44' and having an elongated arc axis 58' in vertical planar alignment with compartment axis 46'. Handle support member 26' includes a support member arced top portion 60' (as seen in FIG. 2) aligned over compartment axis 46' and an opposed arced support arced bottom portion 62' (as seen in FIG. 2) aligned under compartment axis 46'. Arc-shaped handle brace 54' is positioned in opposition to and under support member arced top portion 60'. Cylindrical rod handle 15' is positioned between support member arced top portion 60' and arc-shaped handle brace 54'.

Clamping device 52' (as seen in FIG. 2) further includes a screw member 64' that includes a screw member top end 66' (as seen in FIG. 2) secured to bottom portion of arc-shaped handle brace 54' and a screw member bottom end 68' external to handle support member 26'. Handle support member arced bottom portion 62' defines a threaded hole 70'. Screw member 64' threadably extends through threaded hole 70'. A hand grip 74' for rotating screw member 64' is connected to screw member bottom end 68' external to handle support member 26'. Hand grip 74' is shown as a knurled head, or thumb wheel, FIG. 8. Hand grip 74' can also have other configurations such as conventional "thumb screw" butterfly-type hand grip. As shown in FIG. 8, handle support member 26' optionally includes a neck port 76' that extends downward from handle support member arced bottom portion 62'. The neck portion 76' with its threaded hole 70', and with its mating screw member 64' ends or terminates at screw member bottom end 68 which is connected to with hand grip 74'.

As shown in FIG. 8, clamping device 52 (as seen in FIG. 2) includes an elongated arc-shaped handle brace 54' having a pair of upwardly extending arms 56' that are positioned in holding compartment 44' and having an elongated arc axis 58' in vertical planar alignment with compartment axis 46'. Handle support member 26' includes a support member arced top portion 60' (as seen in FIG. 2) aligned over compartment axis 46' and an opposed arced support arced bottom portion 62' (as seen in FIG. 2) aligned under compartment axis 46'. Arc-shaped handle brace 54' is positioned in opposition to and under support member arced top portion 60'. Cylindrical rod handle 15' is positioned between support member arced top portion 60' and arc-shaped handle brace 54'.

Figure 9:
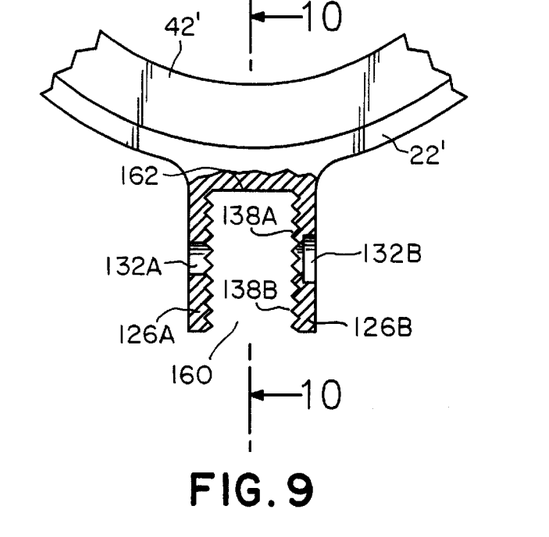
FIG. 9 is a front broken sectional view taken of the double flange of the arm cradle shown in FIG. 8.
Figure 10:
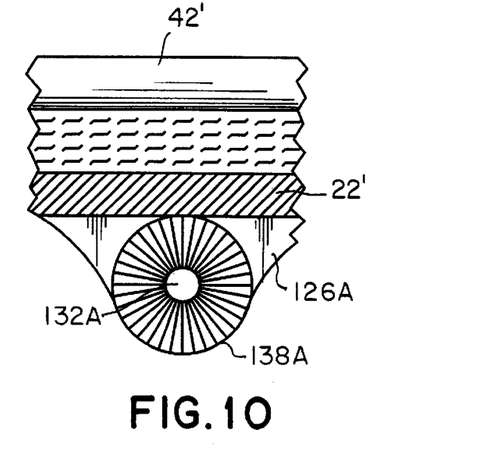
FIG. 10 is a view taken through line 10—10 in FIG. 9.
Figure 11:
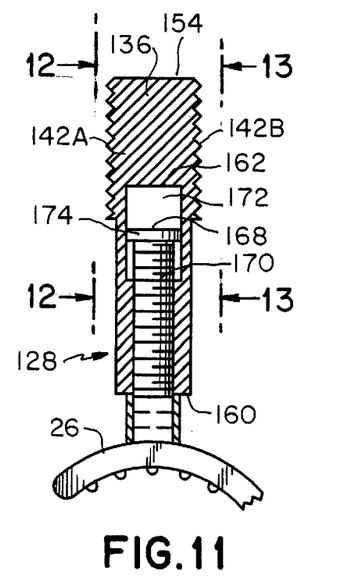
FIG. 11 is a front view of the post member shown in FIG. 8.
Figure 12:
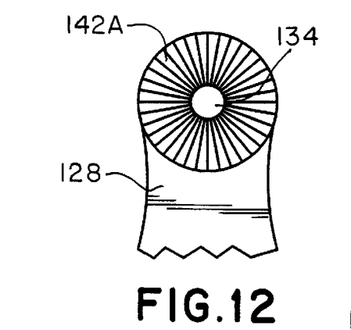
FIG. 12 is broken view taken through line 12—12 in FIG. 11.
Figure 13:
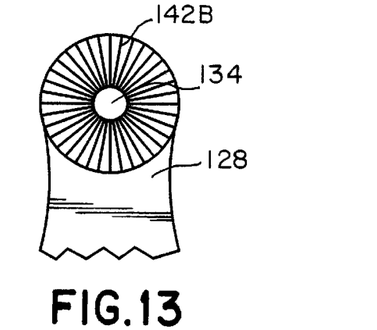
FIG. 13 is a broken view taken through line 13—13 in FIG. 11.

Arm cradle 22', which is partially shown in FIGS. 9 and 10, includes a double cradle flanges 126A and 126B that extend downwardly from cradle bottom portion 38' in a pair of planes lateral to and equally spaced from compartment axis 46'. Cradle flanges 126A and 126B each have a plurality of first radial teeth 138A and 138B, respectively, that extend inward relative to compartment axis 46'. Post member 128, which is shown in isolation in FIGS. 11, 12, and 13, includes a post head 136 having a plurality of opposed first and second radial teeth 142A and 142B, respectively, that extend in opposed circular configurations directly facing first and second radial teeth 138A and 138B, respectively. Axial bolt 130, which is not shown in FIG. 11, is threaded at one end and extends transverse through bolt holes 132A and 132B in cradle flanges 126A and 126B, and the aligned transverse bolt hole 134 in post head 140 including both aligned centers of first and second radial teeth 138A and 138B and both first and second radial teeth 142A and 142B. A flat bolt head 146 connected to one end of axial bolt 130 is pressed against the outer surface of cradle flange 126B, and a wing nut 150 is in threaded relationship with the threaded opposite end 152 of axial bolt 130. FIG. 8 shows wing nut 150 having been rotated inwardly relative to cradle flange 132A so as to press cradle flange 132A and 132B and post head 140 tightly together and so as also to press radial teeth 138A and 142A together in locked relationship, and also radial teeth 138B and 142B are together in locked relationship so that cradle arm 22' is in a locked mode as shown in FIG. 8. The locked mode of FIG. 8 is that of cradle arm 22' at any selected angle relative to the horizontal, with the particular selected angle of FIG. 8 being one that is analogous to the angle $A_1$ shown in FIG. 4 for cradle arm 22. The selected angle $A_1$ is, as before discussed concerning FIG. 4, also relative to holding compartment 44' and to the fishing rod handle 15', the latter being shown as being aligned at the horizontal for purposes of exposition.

Post member 128 includes a post top end 154 positioned adjacent to arm cradle bottom portion 38' and a post free bottom end 156. Post member 128 defines a central post threaded screw hole 158 aligned transverse to axial bolt 130 in planar alignment with arc axis 58' of handle brace 54' and with holding compartment axis 46'. Post screw hole 158 has an open bottom end 160 and a post screw hole closed top end 162. A post screw 164 threadably mounted in screw hole 158 has a post screw lower end 166 connected to handle support member arced top portion 60' and a post screw free upper end 168. As shown in FIG. 8, handle support member 26' is rotatable relative to arm cradle 22' about post screw 164 in one of a post-lengthening direction and a post-shortening direction. In the post-lengthening direction post member 128 is drawn away from handle support member 26', and in the post-shortening direction post member 128 is drawn towards handle support member 26'. Post member 128 is shown in FIG. 8 in a post length mode analogous to the position of post member 34 in FIG. 3. Post member 128 can be positioned at any of a plurality of post positions, for example at the position of post member 34 in FIG. 3.

Post screw free upper end 168 has a limit cap 118 (see FIGS. 2 and 3) that prevents post member 128 from passing beyond a post limit stop 170 positioned in post screw hole 158. Post member 128 optionally has a window 172 that permits the placement of a limit cap 118 onto post screw free upper end 168 during manufacturing. Limit cap 170 can also be a snap-on wing-type cap that is secured to post screw free upper end 168 in the manufacturing process, and as post screw 164 is threaded into post threaded screw hole 158, the snap-on cap is biased by the cylindrical inner surface of post threaded screw hole 158 into its biased mode until it passes limit stop 174, at which time the cap self-biases into an open unbiased mode that extends itself beyond the inner structure of limit stop 174.

Figure 14:
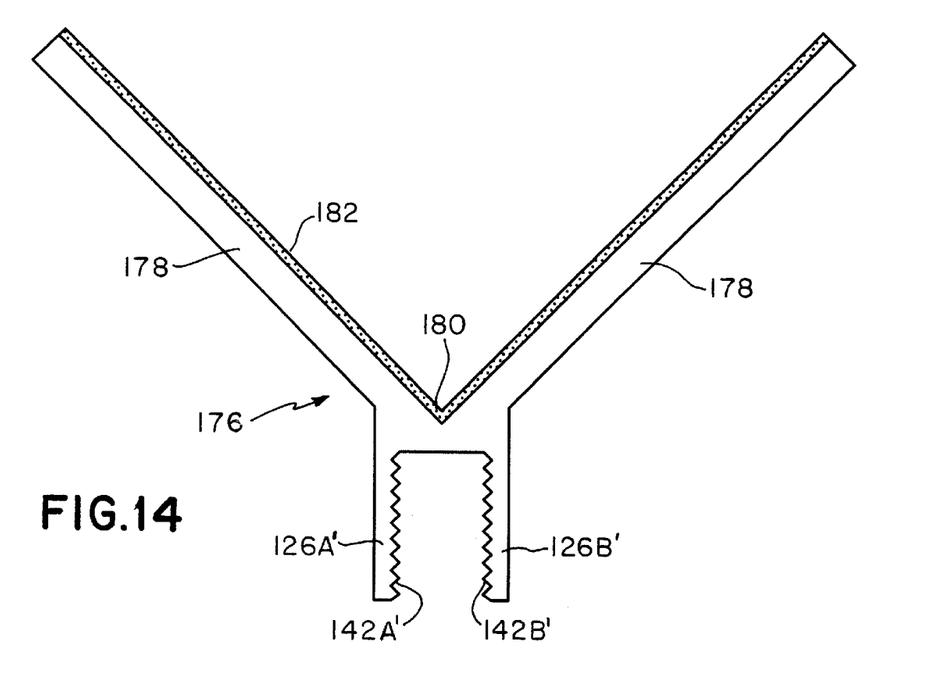
FIG. 14 is a front view of an alternative configuration of the arm cradle shown in FIGS. 1, 2, 3 and 8.

FIG. 14 shows an elongated arm cradle 176 that is another embodiment of arm cradle 22 of adjustable arm support device 10 shown in FIGS. 1–3 and of arm cradle 22' of adjustable arm support device 124 shown in FIG. 8. Arm cradle 176 includes a pair of flat cradle side arms 178 that extend upwardly at a widening angle from an elongated cradle linear center 180 so as to form a V configuration as seen from the front view of FIG. 14. Cradle cushion material 182 is attached to the top side of cradle side arms 178. Arm cradle 176 includes cradle double flanges 126A' and 126B' with opposed radial teeth 142A' and 142B' analogous to cradle double flanges 126A and 126B with opposed radial teeth 142A and 142B, respectively, of arm cradle 22' shown in FIG. 8. An adjustable post member (not shown) analogous to post member 128 of adjustable arm support device 124 shown in FIG. 8 connects arm cradle 176 and a holding compartment (not shown) analogous to holding compartment 44' shown in FIG. 8.

Figure 15:
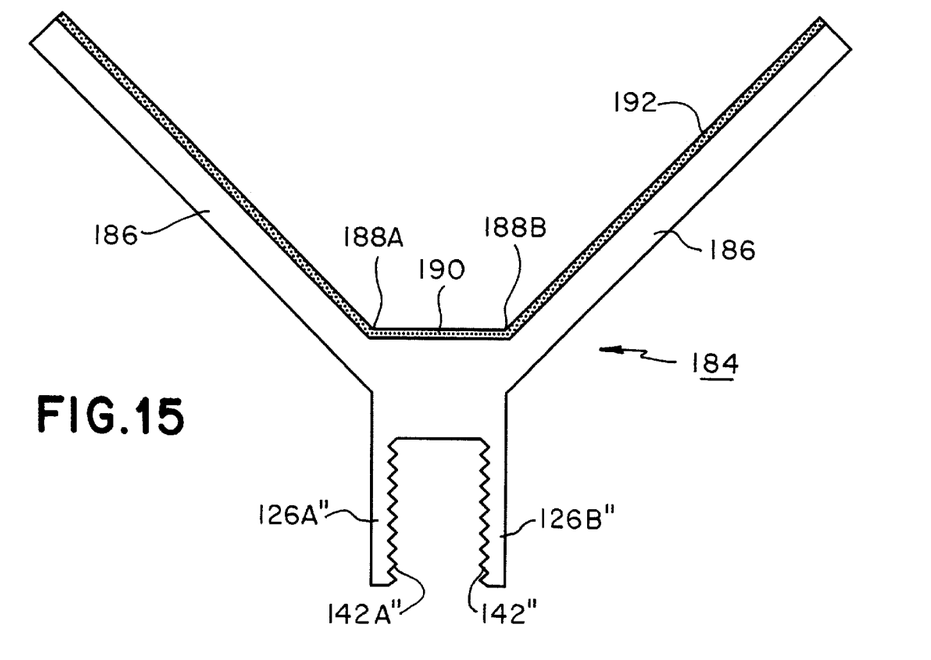
FIG. 15 is a front view of an alternative configuration of the arm cradle shown in FIGS. 1, 2, 3 and 8.

FIG. 15 shows an elongated arm cradle 184 that is another embodiment of arm cradle 22 of adjustable arm support device 10 shown in FIGS. 1–3 and of arm cradle 22' of adjustable arm support device 124 shown in FIG. 8. Arm cradle 184 includes a pair of flat cradle side arms 186 that extend upwardly at a widening angle from the linear edges 188A and 188B of an elongated cradle flat center 190 as seen from the front view of FIG. 15. Cradle cushion material 192 is attached to the top side of cradle side arms 186A and 186B and flat center 190. Arm cradle 184 includes cradle double flanges 126A" and 126B" with opposed radial teeth 142A" and 142B", respectively, analogous to cradle double flanges 126A and 126B and opposed radial teeth 142A and 142B of arm cradle 22' shown in FIG. 8. A adjustable post member (not shown) analogous to post member 128 of adjustable arm support device 124 shown in FIG. 8 connects arm cradle 184 and a holding compartment (not shown) analogous to holding compartment 44' shown in FIG. 8.

Figure 16:
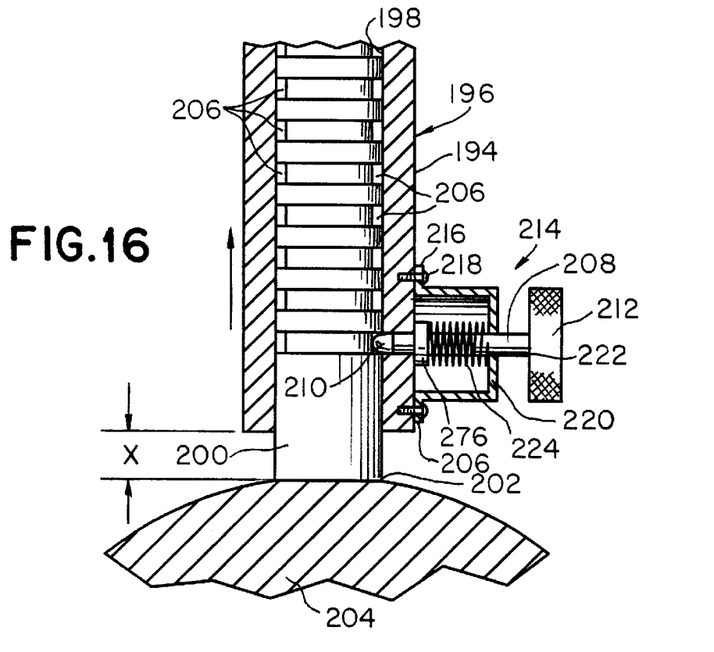
FIG. 16 is a broken sectional view of an alternative embodiment of an adjustable connecting post with a locking pin.

A broken view of the lower portion 194 of a post member 196 shown in FIG. 16 is generally analogous to the lower portions of post member 34 of adjustable arm support device 10 and post member 128 of adjustable arm support device 124 that include post screws 64 and 164, respectively. Post member 196 defines a cylindrical bore 198 in which a cylindrical column 200 is positioned. Column 200 has a bottom end 202 that is connected to a handle support member 204 analogous to handle support member 26 of adjustable arm support device 10. Column 200 has an outer diameter that is slightly less than the inner diameter of bore 198 so that post member 196 is slidable upwardly and downwardly relative to column 200. Column 200 further has a series of ring grooves 206 having inner diameters less than the outer diameter of column 200. A cylindrical locking pin 208 having a diameter less than the widths of ring grooves 206 is oriented transverse to column 200 and is positioned external to post member 196 near bottom end 202. Locking pin 208 has an inner end 210 that can be slidably positioned in any selected ring groove 206 and an opposed outer end to which is mounted a cylindrical knurled hand grip 212. A mounting sleeve 214 has flanges 216 that are connected to the outside of post member 196 by screws 218. Mounting sleeve 214 includes an outer wall 220 lateral to post member 196 that defines a pin hole 222 through which locking pin 208 extends. A coil compression spring 224 positioned within in mounting sleeve 214 encircles locking pin 208. A spring stop 226 is positioned between coil spring 224 and the outer surface of post member 196. Coil spring 224 is positioned within mounting sleeve 214 between spring stop 226 and outer wall 220. Coil spring 224 is movable between a biased mode and an unbiased mode. As shown in FIG. 16, inner end 210 of locking pin 208 is set in a locking mode in a one of ring grooves 206 with coil spring 224 in its unbiased mode. In the locking mode of locking pin 208, post member 196 is locked at a selected position relative to column 200 and more generally, the bottom 228 of post member 196 is locked at a selected distance, indicated as distance X, from handle support member 204. When another distance between post member 196 and handle support member 204 is desired, the user holds hand grip 212 and pulls locking pin 208 out of the first ring groove so that coil spring 224 is forced into its biased mode so as to free column 200 relative to post member 196. The user then raises or lowers post member 196 relative to handle support member 202 to a new selected distance (not shown) and releases the hold on hand grip 212 so that locking pin 208 is moved into the new selected ring groove 206 by the self-biased movement of coil spring 224 from its biased mode into its unbiased mode.

Although the present invention has been described in some detail by way of illustration and example for purposes of clarity and understanding, it will, of course, be understood that various changes and modifications may be made in the form, details, and arrangements of the parts without departing from the scope of the invention set forth in the following claims.

What is claimed is:

1. A device supporting the arm of a fisherman using a spinning-type fishing rod having a cylindrical rod handle comprising:

cradle means for supporting the upper forearm of the fisherman, said cradle means includes an elongated arced cradle member having a bottom portion and a pair of cradle side arms extending upwardly from said bottom portion;

cradle angle means for rotating said cradle member to a selected angle relative to said rod handle and removably locking said cradle member at said selected angle;

handle support means, for holding a selected area of the rod handle in alignment with said cradle means, being positioned below said cradle means, and including an elongated handle support member defining a generally cylindrical compartment having a compartment axis, said rod handle having a rod axis and a maximum diameter, said cylindrical compartment having a compartment diameter greater than the rod handle maximum diameter, the rod handle being positioned in said compartment with said rod handle axis and said compartment axis being in parallel alignment;

post means for connecting said cradle means and said handle support means:

post adjusting means for moving said post means between said cradle member and said handle support means to a selected length and removably locking said post means at said selected length;

clamping means for removably gripping said rod handle to said handle support means; and said post adjusting means includes a post member positioned between said cradle member and said handle support member and wherein said cradle angle means includes a cradle flange extending downwardly from said cradle bottom portion in a plane lateral to and spaced from said compartment axis; said cradle flange having a plurality of cradle radial teeth extending and facing inwardly relative to said compartment axis in a circular configuration, and wherein said cradle angle means further includes said post member and a post flange having a plurality of post radial teeth extending in a circular configuration directly facing said cradle radial teeth, and an axial bolt extending transversely through said cradle flange and through said post flange; said cradle flange and said post flange being rotatable around said axial bolt, said cradle flange with said cradle radial teeth and said post member with said post radial teeth being movable transversely relative one to the other between a locked mode wherein said cradle radial teeth and said post radial teeth are intermeshed and an unlocked mode wherein said first and second radial teeth are spaced from one another, and wherein in said unlocked mode, said cradle and said handle support member are rotatable about said axial bolt to a selected angled relationship between said cradle and the handle support member, and wherein in said locked mode said cradle is non-rotatable about said axial bolt relative to said handle support member.

2. The device according to claim 1, wherein said handle support member further defines a side aperture having opposed linear edges parallel to said compartment axis defining a distance therebetween greater than said maximum rod handle diameter.

3. The device according to claim 1, wherein said clamping means includes an elongated arc-shaped handle brace having a pair of upwardly extending arms positioned in said generally cylindrical compartment and having an arc axis parallel to said compartment axis, said handle support member including a support member arced top portion aligned over said compartment axis, said arc-shaped handle brace being opposed to said support member arced top portion, the cylindrical rod handle being positioned between said support member arced top portion and said arc-shaped handle brace.

4. The device according to claim 3, wherein said clamping means further includes a screw member including a screw member top end secured to said arc-shaped handle brace bottom portion and a screw member bottom end external to said handle support, said handle support member including a handle support member arced bottom portion defining a threaded hole, said screw member further threadably extending through said threaded hole, and further including a hand grip connected to said screw bottom external to said handle support member.

5. The device according to claim 4, further including a neck portion integral with and extending downward from said handle support member arced bottom portion, said neck portion having a neck threaded hole aligned with said threaded hole of said handle support member arced bottom portion, said screw member extending through said neck threaded hole, said hand grip being external to said neck member.

6. The device according to claim 1, wherein said axial bolt includes opposed ends, one of said ends having a flat bolt head in relationship to one or the other of said cradle flange and said post member, and the other of said ends being a threaded end and extending beyond one or the other of said cradle wall and said post member and further including a locking nut threadably mounted to said threaded end, said locking nut being rotatable in a first direction wherein said cradle and post radial teeth are intermeshed in said locked mode and rotatable in an opposed second direction wherein said cradle and post radial teeth are spaced from one another in said unlocked mode.

7. The device according to claim 1, wherein said post member defines a post screw hole aligned transverse to said axial bolt, said post adjusting means further including a post screw threadably mounted in said screw hole, said post screw having one end connected to said handle support member arced upper portion and the other end being a free end, said handle support member being rotatable relative to said cradle about said post screw in one of a post lengthening direction and a post shortening direction, wherein in said post lengthening direction said post member is drawn away from said handle support member and wherein said post shortening direction said post is drawn towards said handle support member.

8. The device according to claim 1, wherein said bottom portion and said pair of cradle side arms are configured as an elongated arc.

9. The device according to claim 1, wherein said bottom portion is configured as an elongated linear portion and said pair of cradle side arms are configured as a pair of elongated flat members extending outwardly at equal angles from said linear portion.

10. The device according to claim 1, wherein said bottom portion is configured as flat member having a pair of opposed linear edges and said pair of cradle arms are configured as a pair of flat members connected to said linear edges and extending outwardly at equal angles from said linear edges.

11. A device supporting the arm of a fisherman using a spinning-type fishing rod having a cylindrical rod handle, comprising:

cradle means for supporting the upper forearm of the fisherman, said cradle means includes an elongated arced cradle member having a bottom portion and a pair of cradle side arms extending upwardly from said bottom portion;

cradle angle means for rotating said cradle member to a selected angle relative to said rod handle and removably locking said cradle member at said selected angle;

handle support means, for holding a selected area of the rod handle in alignment with said cradle means, being positioned below said cradle means, and including an elongated handle support member defining a generally cylindrical compartment having a compartment axis, said rod handle having a rod axis and a maximum diameter, said cylindrical compartment having a compartment diameter greater than the rod handle maximum diameter, the rod handle being positioned in said compartment with said rod handle axis and said compartment axis being in parallel alignment;

post means for connecting said cradle means and said handle support means:

post adjusting means for moving said post means between said cradle member and said handle support means to a selected length and removably locking said post means at selected length;

clamping means for removably gripping said rod handle to said handle support means;

said post adjusting means includes a post member positioned between said cradle member and said handle support member and wherein said cradle angle means include a pair of cradle flanges extending downwardly from said cradle bottom portion in spaced planes lateral to and equally spaced from said compartment axis; each of said pair of cradle flanges having a plurality of cradle radial teeth in opposed relationship and facing inward relative to said compartment axis each in a circular configuration, and wherein said cradle angle means further includes said post member and a post head flange having an opposed pair of outwardly oriented post radial teeth each extending in circular configuration directly facing said pair of cradle flanges and said pair of cradle radial teeth, and further including an axial bolt extending transversely through said pair of cradle flanges and through said post head flange; said pair of cradle flanges and said post head flange being rotatable around said axial bolt, said pair of cradle flanges with said pair of cradle radial teeth and said post member with said pair of post radial teeth being movable transversely relative one to the other between a locked mode; wherein said cradle flange teeth and said post head flange teeth are intermeshed and an unlocked mode wherein said cradle and said post radial teeth are spaced from one another, and wherein in said unlocked mode, said cradle and said handle support member are rotatable about said axial bolt to a selected angled relationship between said cradle and the handle support member, and wherein in said locked mode said cradle is non-rotatable about said axial bolt relative to said handle support member.

12. The device according to claim 11, wherein said axial bolt includes opposed ends, one of said ends having a flat bolt head in relationship to one or the other of said pair of cradle flanges, and the other of said ends being a threaded end and extending beyond one or the other of said pair of cradle flanges, and further including a locking nut threadably mounted to said threaded end, said locking nut being rotatable in a first direction wherein said cradle and post radial teeth are intermeshed in said locked mode and rotatable in an opposed second direction wherein said cradle and post radial teeth are spaced from one another in said unlocked mode.

* * * * *